(12) United States Patent
Chen et al.

(10) Patent No.: US 7,372,991 B2
(45) Date of Patent: May 13, 2008

(54) METHOD AND APPARATUS FOR SUMMARIZING AND INDEXING THE CONTENTS OF AN AUDIO-VISUAL PRESENTATION

(75) Inventors: William Chen, Foster City, CA (US); Jau-Yuen Chen, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 766 days.

(21) Appl. No.: 10/672,436

(22) Filed: Sep. 26, 2003

(65) Prior Publication Data

US 2005/0078868 A1   Apr. 14, 2005

(51) Int. Cl.
*G06K 9/34* (2006.01)

(52) U.S. Cl. .................. 382/173; 382/168; 382/305

(58) Field of Classification Search ............... 382/168, 382/171, 173, 305
See application file for complete search history.

(56) References Cited

U.S. PATENT DOCUMENTS

| | | | |
|---|---|---|---|
| 5,119,474 A | 6/1992 | Beitel et al. | |
| 5,708,825 A | 1/1998 | Sotomayor | |
| 5,805,733 A | 9/1998 | Wang et al. | |
| 5,963,205 A | 10/1999 | Sotomayor | |
| 6,212,527 B1 | 4/2001 | Gustman | |
| 6,236,395 B1 | 5/2001 | Sezan et al. | |
| 6,272,240 B1 | 8/2001 | Li et al. | |
| 6,301,385 B1 | 10/2001 | Chen et al. | |
| 6,337,917 B1 | 1/2002 | Onural et al. | |
| 6,369,835 B1 | 4/2002 | Lin | |
| 6,397,213 B1 | 5/2002 | Cullen et al. | |
| 6,404,925 B1 | 6/2002 | Foote et al. | |
| 6,408,028 B1 | 6/2002 | Manjunath et al. | |
| 6,408,301 B1 | 6/2002 | Patton et al. | |
| 6,430,582 B1 | 8/2002 | Duncombe | |
| 6,473,096 B1 | 10/2002 | Kobayashi et al. | |
| 6,535,639 B1 * | 3/2003 | Uchihachi et al. ........... 382/225 |
| 6,578,040 B1 | 6/2003 | Syeda-Mahmood | |
| 6,690,725 B1 * | 2/2004 | Abdeljaoud et al. ... 375/240.08 |
| 6,925,455 B2 | 8/2005 | Gong et al. | |
| 7,016,540 B1 * | 3/2006 | Gong et al. ................. 382/225 |
| 2001/0020954 A1 | 9/2001 | Hull et al. | |
| 2002/0164151 A1 | 11/2002 | Jasinschi et al. | |

(Continued)

FOREIGN PATENT DOCUMENTS

JP   2001-346140   12/2001

(Continued)

OTHER PUBLICATIONS

Tiecheng Liu, et al., "Analysis and Enhancement of Videos of Electronic Slide Presentations", Multimedia and Expo, 2002, ICME '02 Proceedings, Aug. 26, 2002, vol. 1, pp. 77-80.

(Continued)

*Primary Examiner*—Cameron Saadat (57) ABSTRACT

A method for creating a summary of an audiovisual presentation initiates with segmenting a frame of the audiovisual presentation. Then, a slide region of the segmented frame is identified. Next, a histogram representing lines in the slide region is generated. Next, moving regions associated with successive frames from the histogram are suppressed. A computer readable medium, a system for providing a real time summarization of a meeting and an integrated circuit are also provided.

15 Claims, 7 Drawing Sheets

U.S. PATENT DOCUMENTS

| | | |
|---|---|---|
| 2004/0202349 A1* | 10/2004 | Erol et al. .................. 382/100 |
| 2004/0255150 A1 | 12/2004 | Sezan et al. |
| 2004/0261095 A1 | 12/2004 | Sezan et al. |
| 2004/0267805 A1 | 12/2004 | Sezan et al. |
| 2004/0268383 A1 | 12/2004 | Sezan et al. |
| 2004/0268389 A1 | 12/2004 | Sezan et al. |
| 2004/0268390 A1 | 12/2004 | Sezan et al. |

FOREIGN PATENT DOCUMENTS

| | | |
|---|---|---|
| JP | 2002-251197 | 9/2002 |
| WO | WO 00/46749 A1 | 8/2000 |
| WO | WO 00/65483 A2 | 11/2000 |
| WO | WO 02/21324 A1 | 3/2002 |

OTHER PUBLICATIONS

Dulce Ponceleon, et al., "Hierarchical Brushing in a Collection of Video Data", Proceedings of the 34th Hawaii International Conference on System Sciences, Jan. 3-6, 2001, pp. 1-8.

Arnon Amir, et al., "Towards Automatic Real Time Preparation of On-Line Video Proceedings for Conference Talks and Presentations", System Sciences, 2001, Proceedings of the 34th Annual Hawaii International Conference, Jan. 3-6, 2001, pp. 1662-1669.

Chitra Dorai, et al., "Structuralizing Educational Videos Based on Presentation Content", Proceedings 2003 International Conference on Image Processing, vol. 2 or 3, Sep. 14, 2003, pp. 1029-1032.

* cited by examiner

METHOD AND APPARATUS FOR SUMMARIZING AND INDEXING THE CONTENTS OF AN AUDIO-VISUAL PRESENTATION

BACKGROUND OF THE INVENTION

1. Field of the Invention

This invention relates generally to information processing and more particularly to a method and apparatus for summarizing and indexing the contents of an audiovisual presentation.

2. Description of the Related Art

Formal presentations serve an important and popular means of communication. In academia and industry, the capture of such presentations for subsequent online viewing has become routine for applications such as distance-learning and technical training. Recording the seminars and placing the content online provides users the benefits of anywhere, anytime, and anyone viewing due to the ubiquitous nature of the Internet. Additionally, seminars having multiple presentations running concomitantly, force an individual to make a choice to attend one of the multiple presentations, when the individual may desire to attend more than one of the concomitant presentations.

Previous work on automatic video summarization may be characterized to fall into one of three broad areas: segmentation, analysis, and presentation. Segmentation involves the partitioning of a frame of video. For the domain of audio-visual presentations, segmentation requires consideration of changing lighting conditions, speaker movements, and camera pan/zooms. One of the shortcomings of the available techniques that segment audio-visual presentations is the inability to effectively handle the changing lighting conditions, speaker movements, and camera pan/zooms. Furthermore, there are no available techniques that are capable of indexing the audio visual content once the content is segmented, nor are there any techniques for summarizing the content for easy retrieval by a user. The problems become more acute when a user is accessing the video data through a handheld device with limited computational resources.

As a result, there is a need to solve the problems of the prior art to enable automatic indexing and an effective scheme for summarizing the content of an audiovisual presentation that enables a user to efficiently locate desired information.

SUMMARY OF THE INVENTION

Broadly speaking, the present invention fills these needs by providing a method and system capable of automatically summarizing the contents of an audiovisual presentation in real time. It should be appreciated that the present invention can be implemented in numerous ways, including as a method, a system, computer readable media or a device. Several inventive embodiments of the present invention are described below.

In one embodiment, a method for segmenting image data is provided. The method initiates with identifying a pixel associated with a current frame of the image data. Then, a neighborhood of pixels is defined around the pixel associated with the current frame. The defining of the neighborhood includes generating a three dimensional neighborhood. Next, a distance between the pixel associated with the current frame and each pixel associated with the neighborhood of pixels is compared to determine a smallest distance. Then, if the pixel associated with the current frame belongs to a current segment of the image data is determined based upon the smallest distance.

In another embodiment, a method for creating a summary of an audiovisual presentation is provided. The method initiates with segmenting a frame of the audiovisual presentation. Then, a slide region of the segmented frame is identified. Next, a histogram representing lines in the slide region is generated. Then, moving regions associated with successive frames from the histogram are suppressed.

In yet another embodiment, a computer readable media having program instructions for segmenting image data is provided. The computer readable medium includes program instructions for identifying a pixel associated with a current frame of the image data. Program instructions for defining a neighborhood of pixels around the pixel associated with the current frame are provided, where the program instructions for defining the neighborhood include program instructions for program instructions for generating a three dimensional neighborhood. Program instructions for comparing a distance between the pixel associated with the current frame and each pixel associated with the neighborhood of pixels to determine a smallest distance are included. Program instructions for determining if the pixel associated with the current frame belongs to a current segment of the image data based upon the smallest distance are also included.

In still yet another embodiment, a computer readable medium having program instructions for creating a summary of an audiovisual presentation is provided. The computer readable medium includes program instructions for segmenting a frame of the audiovisual presentation. Program instructions for identifying a slide region of the segmented frame are provided. Program instructions for generating a histogram representing lines in the slide region and program instructions for suppressing moving regions associated with successive frames from the histogram are included.

In another embodiment, a system configured to capture and summarize an audiovisual presentation is provided. The system includes a recording device capable of capturing audio and video signals from the presentation. A computing device in communication with the recording device is included. The computing device has access to audiovisual data of the audiovisual presentation. The computing device includes a slide segmentation module configured to extract a slide region from a frame of the video signals according to a single pass color segmentation scheme.

In yet another embodiment, a system configured to provide a real-time summarization of a meeting is provided. The system includes an image capture device configured to capture a presentation associated with the meeting. A media server configured to receive captured presentation data from the image capture device is included. The media server has access to copies of presentation media used for the meeting. The media server is further configured to generate summary data corresponding to the presentation from the captured presentation data. The summary data is associated with presentation media transition points of the meeting. A client in communication with the media server is also included. The client is capable of receiving the summary data.

In still yet another embodiment, an integrated circuit is provided. The integrated circuit includes segmentation circuitry configured to segment a frame of image data into regions. The segmentation circuitry is capable of identifying one of the regions as a slide region through analysis of a color characteristic and a shape characteristic associated with each of the regions. Shot detection circuitry configured to identify a group of frames associated with the frame through analysis of edge information of the slide region with adjacent frames of the image data is also included.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a system, and method for automatically generating a summarization of an audiovisual presentation. It will be apparent, however, to one skilled in the art, in light of this disclosure, that the present invention may be practiced without some or all of these specific details. In other instances, well known process operations have not been described in detail in order not to unnecessarily obscure the present invention.

The embodiments described herein provide a method and system that captures and automatically summarizes an audio-visual presentation in real-time. From the video, audio, and slide presentation, a table of contents (TOC) that highlights key topics with links to the corresponding slides and video files is automatically generated. Thus, with access to the audio-visual recording of a presentation, i.e., slide presentation, and the stored presentation material, a TOC is built for the presentation so that a user may select a particular segment of the presentation. Additionally, the summarization of the presentation through the TOC, or some other suitable summarization technique, enables a user having a handheld device, e.g., a personal digital assistant (PDA), a cellular phone, a web tablet, etc., to view the summarization page. Thereafter, the user may download a specific frame of video which can be processed by the limited resources of the handheld device, as opposed to a video stream of the presentation, which would be beyond the limited computational capabilities of consumer handheld devices.

As will be explained in more detail below, the key modules in the system includes a slide segmentation module, a shot detection module, and a template matching module. The slide segmentation module is configured to extract a slide region from each frame of the digital recording device, e.g., camcorder, recording the presentation. The shot detection module then identifies groups of video frames according to slide transitions. The template matching module then links the stored slide to a corresponding video shot through analysis of the extracted slide region.

The input into the system is a combination of audio-visual signals generated from a recording e.g., digital camcorder or any other suitable digital video recorder, of the presentation or meeting and textual information from an original presentation media, such as a slide presentation. In one embodiment, the slide presentation is a POWERPOINT presentation. For the input to the system, it is assumed that access to the audio-visual recording and the original presentation media from the presentation is available. Additionally, the projected slides of the presentation media are captured by the digital video recording.

Figure 1:
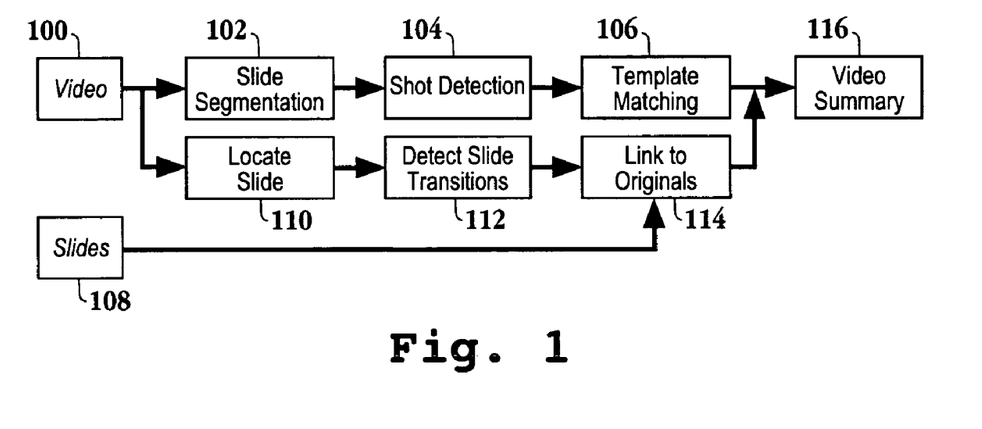
FIG. 1 is a high-level block diagram illustrating the modules associated with the generation of the table of contents for an audio-visual presentation in accordance with one embodiment of the invention.

FIG. 1 is a high-level block diagram illustrating the modules associated with the generation of the table of contents for an audio-visual presentation in accordance with one embodiment of the invention. A frame of video 100 is received by slide segmentation module 102. Slide segmentation module 102 is configured to extract a slide from the frame of video 100 for template matching as will be explained in more detail below. As can be seen, slide segmentation module 102 is associated with module 110 which locates the slide region. In one embodiment, slide segmentation is performed by first applying color segmentation to each frame of the video. The slide region is then identified as the dominant, coherent color region with a compact shape (e.g., a rectangular shape ratio for a slide).

Shot detection module 104 of FIG. 1, then compares successive frames of video data for differences in order to identify all frames of a segment of the video data that are associated with the slide extracted from slide segmentation module 102. As will be explained further below, shot detection module 104 is associated with module 112 where slide transitions are detected in order to identify the segment of the video data having a same slide for each frame. In essence, shot detection module 104 parses the video into shots based on slide transitions. Each shot effectively captures the speaker presenting the contents from a single slide. In one embodiment, for robustness, the slide region is transformed into a one-bit representation using edge detection and binary thresholding. The one-bit representation is then transformed to the Hough parameter domain and an edge histogram is generated from the Hough parameters.

Correlation between edge histograms is used to generate a trace of the slide similarity. Peaks in this trace are used to detect slide transitions and shot boundaries. Included in shot detection module 104 is a motion suppression module configured to reduce the effects of moving objects, e.g., the speaker or an object controlled by the speaker, that intersects the slide region and causes false slide transitions.

Still referring to FIG. 1, a key frame which represents the segment of the video data captured by shot detection module 104 is then matched with stored slide 108 through template matching module 106. That is, a matching algorithm which is linked to the original slides through module 114, processes the key frame data from shot detection module 104 in order to determine and match with one of original slides 108. Here, a keyframe, which contains just the extracted slide region, is used as a template and matched against each of the original slides (or copies of the original slides). For robustness, the matching algorithm preprocesses the keyframe and original slides into a one-bit representation using edge detection and binary thresholding. The one-bit representation is then transformed into an edge histogram using spatial X/Y projection. Similarity between the keyframe and the original slides is measured using a chi-squared metric on the corresponding edge histograms. Thereafter, a summary of the video presentation is generated through module 116.

Figure 2:
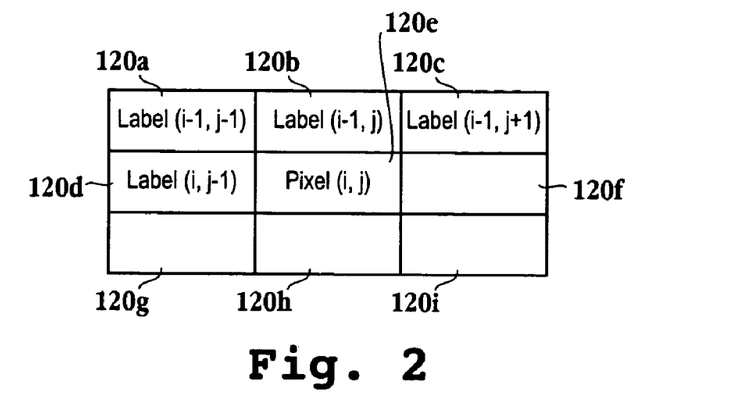
FIG. 2 is a schematic diagram illustrating how a traditional image segmentation system is restricted to comparing pixels with four predecessors in causal order.

FIG. 2 is a schematic diagram illustrating how a traditional image segmentation system is restricted to comparing pixels with four predecessors in causal order. Here, pixel (i,j) 120e is associated with a frame of video data that includes predecessor labels associated with pixel locations 120a through 120d. However, the labels associated with pixel locations 120f through 120i are unknown at this time. Therefore, the traditional method may use a two-step process where the first step scans the frame to get the data and then a second scan is used to do the segmentation. Alternatively, the traditional process may ignore the future data of pixel locations 120f through 120i. Under either alternative, causal constraints restrict the traditional image segmentation system to only comparing pixels with the four predecessors in causal order as described above.

Figure 3:
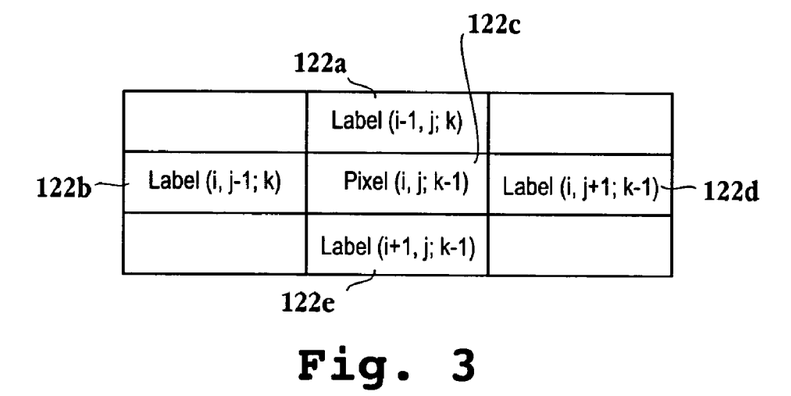
FIG. 3 is a schematic diagram representing a technique for comparing a reference pixel with five neighbors from a current frame and a previous frame in causal order in accordance with one embodiment of the invention.

FIG. 3 is a schematic diagram representing a technique for comparing a reference pixel with five neighbors from a current frame and a previous frame in causal order in accordance with one embodiment of the invention. Here, a three-dimensional neighborhood is created where two dimensions are represented in the current frame, i.e., the x and y coordinates, and one dimension is represented in time, i.e., the previous frame. Thus, spatial and temporal characteristics are considered in the neighborhood. It should be appreciated that the pixels associated with locations 122a and 122b are from a current frame as they are known. Whereas, the pixels associated with positions 122c, 122d, and 122e are from a previous frame. Thus, the pixels associated with positions 122c through 122e borrow future information from a previous frame. One skilled in the art will appreciate that the previous frame pixels do not differ significantly as compared to the corresponding current frame pixels, therefore, the previous frame pixels act as a good approximation for the color segmentation technique described herein.

Figure 4:
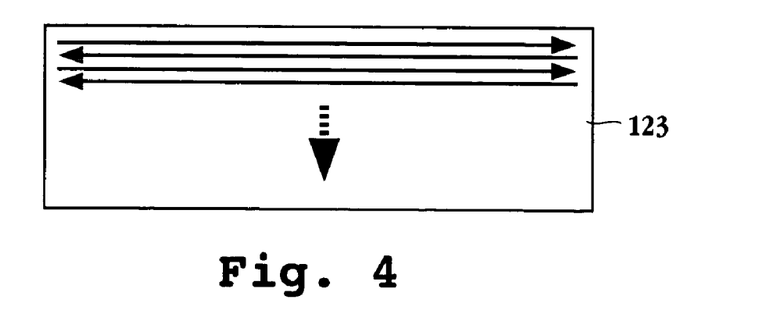
FIG. 4 is an exemplary representation of a scan line order when processing a frame of video data in accordance with one embodiment of the invention.

FIG. 4 is an exemplary representation of a scan line order when processing a frame of video data in accordance with one embodiment of the invention. Here, the scan line initiates in the upper left pixel of frame 123 and zigzags through the whole frame as represented in FIG. 4. It will be apparent to one skilled in the art that the scan line order is shown for exemplary purposes only and is not meant to be limiting as any suitable scan line order may be utilized. Additionally, a neighborhood of five predecessors is exemplary and not meant to be limiting as any suitable number of predecessors may used with the embodiments herein.

Table 1 illustrates a one pass segmentation algorithm configured to utilize the five predecessors mentioned above for video segmentation.

TABLE 1

Symbol:label(i,j;k) : the label for pixel (i,j) in frame k
Initial label(i,j;0) to 0 for all i,j
For each frame k in video,
Compute centroid of each segment
Reset number of point for each segment
Begin,
  For pixel (i,j) in frame k,
    Compute distance from label (i,j;k−1) to label (i−1,j;k) and label (i,j−1;k)
    Merge labels if distance <th3
    Compute distance from pixel(i,j;k) to label of its causal predecessor as
    {label(i,j−1;k), label(i−1,j;k), label(i,j;k−1), label (i,j+1;k−1), label(i+1,j;k−1) }
    Let mind be smallest distance and minl be the corresponding label
    If mind<th1,
      Lablel(i,j;k)=minl;
    Else
      Let mind2 be the smallest distance of pixel(i,j;k) and all labels
      Let minl2 be such a label.
      If mind2<th2;
        Let minl=minl2
      Else
      Create new segment
      Min1 = label of new segment
      Endif
    Endif
    Update segment indexed by minl to include pixel(i,j;k)
  End
End.

Starting from the upper left pixel, the one pass algorithm zigzags through the whole frame as described in FIG. 4. For each pixel (i,j;k), the algorithm compares the distance between pixel (i,j;k), and a label of the pixel's causal predecessor as described in FIG. 3. It should be appreciated that the phrase "distance between pixels," as used herein, refers to the Euclidean distance between corresponding pixels. Of course, the color model associated with the pixels is taken into account for the distance calculation. In one embodiment, the smallest distance is then compared with a threshold to decide if pixel (i,j;k) belongs to the current segment. If the pixel doesn't belong to the current segment, the algorithm will check through all label i and compare with a lower threshold to decide if the pixel belongs to a previous segment. In effect, this reduces the number of small, isolated segments that are created because the segments are not connected. If the pixel still doesn't belong to any segment a new segment which contains only pixel (i,j;k) is then created.

A merge process is commonly used after the first round of segmentation in image segmentation. However, the merge process is usually designed in an iterative approach. To avoid the unpredictable time that the traditional merge process requires, the embodiments described herein employs a merge-in-time approach, which merges segments in the next frame by comparing label (i,j,k−1) from the previous frame with label (i−1,j,k) and label (i,j−1,k) from the current frame. This approach safely merges fragments without the risk of a long execution time.

Figure 5A:
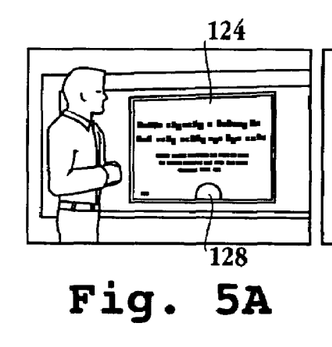
FIGS. 5A through 5C represent the segmentation results from the color segmentation scan described with reference to FIG. 3 and Table 1.
Figure 5B:
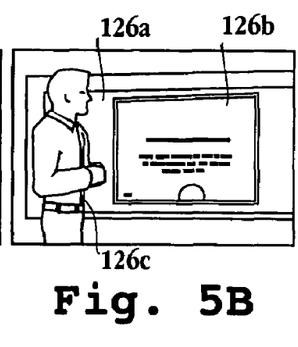
Figure 5C:
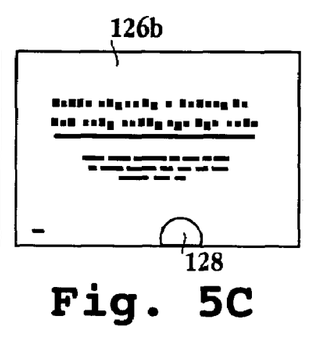

FIGS. 5A through 5C represent the segmentation results from the color segmentation scan described with reference to FIG. 3 and Table 1. FIG. 5A represents a frame of video data 124. The frame of video data 124 includes a slide presentation. The slide presentation may include artifacts, such as reflection 128 from a projector. FIG. 5B represents the frame of video data 124 from FIG. 5A after which the color segmentation technique, i.e., slide segmentation, described above has been applied. The regions having different shading within FIG. 5B are identified through the color segmentation technique. For example, region 126a represents one dominant and coherent region, while region 126b represents another dominant and coherent region. Region 126c represents yet another dominant and coherent region. FIG. 5C represents the extracted slide region 126b from FIG. 5B. That is, through the application of a one pass segmentation algorithm, such as the algorithm of TABLE 1, the slide region may be identified. As mentioned above, each of the segmented regions may be identified as a dominant coherent color type. The slide region may then be identified from the remaining region by using a shape ratio configured to identify the slide region. Additionally, a threshold value may be used to discard small regions prior to checking for the shape ratio. It will be apparent to one skilled in the art that the extracted slide region 126b has poor contrast due to the dark lighting conditions and contains artifacts such as the reflection 128 from a projector.

Figure 6:
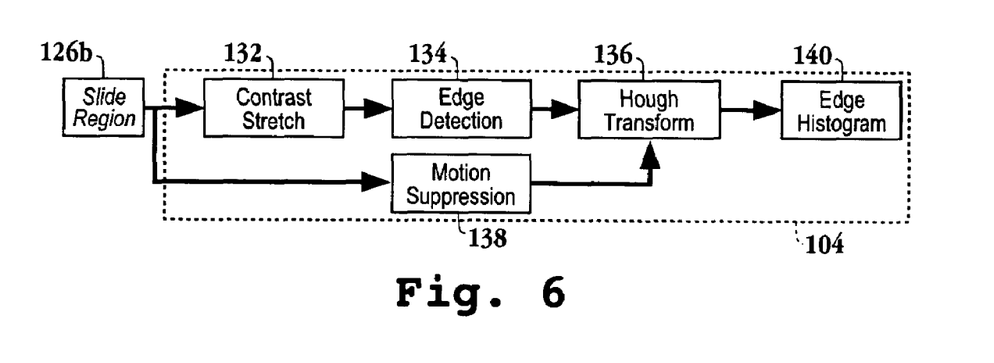
FIG. 6 is a schematic diagram illustrating the modules for generating a one-bit representation for a slide region in accordance with one embodiment of the invention.

FIG. 6 is a schematic diagram illustrating the modules for generating a one-bit representation for a slide region in accordance with one embodiment of the invention. Rather than using the extracted slide region for direct comparison to a database slide in order to find a match, the extracted slide region is cleaned up through the modules of FIG. 6 in order to more efficiently match the extracted slide region with a stored presentation slide. The contrast associated with slide region 126b is stretched in module 132. In one embodiment, a luminance histogram is generated over the slide region and stretched at the two endpoints of the histogram until it covers the range from 0-255. It will be apparent to one skilled in the art that the contrast stretch of module 132 greatly increases the sharpness of the slide content. An edge detector is then applied to the generated luminance histogram in module 134. In one embodiment, the edge detector is a canny edge detector, however, the edge detector may be any suitable edge detector. One skilled in the art will appreciate that the edge detector of module 134 is configured to capture the important outlines of the text and figures in the slide region. The output of the edge detector is then the input to module 136 where the edges and lines of the one-bit representation is transformed into the parameter space using the Hough transform.

As is generally known, the Hough transform is a popular method of extracting geometric primitives. With respect to the embodiments described herein, there is an interest in the outlines of text and figures within the slide region. The Hough transform converts the lines from x-y spatial domain into the $(\rho,\theta)$ parameter domain according to the following equation:

$$\rho = x^*\cos(\theta) + y^*\sin(\theta) \qquad (1)$$

Here, $\rho$ is the distance from the line to the origin, and $\theta$ is the angle between the axis x and the perpendicular to the line vector that points from the origin to the line. Because every pixel in the image may belong to several lines, an accumulator $A(\rho,\theta)$ that measures the strength of line parameters $(\rho,\theta)$ is maintained. The accumulator values are then thresholded to distinguish between lines and noise features. Then, a one-dimensional histogram is generated from the accumulator to represent the lines in the slide region.

It should be appreciated that in addition to the poor contrast and lighting in slide region 126b of FIG. 5C, a speaker may be moving in front of the slide region, thereby occluding text regions and creating shadows. The occlusion and shadows may create edges and lines that are captured by the Hough transform. Therefore, in order to compensate for the occlusion and shadows a motion mask is developed through motion suppression module 138. The motion mask detects moving regions and then suppresses them from the edge histogram 140 as described below.

Figure 7:
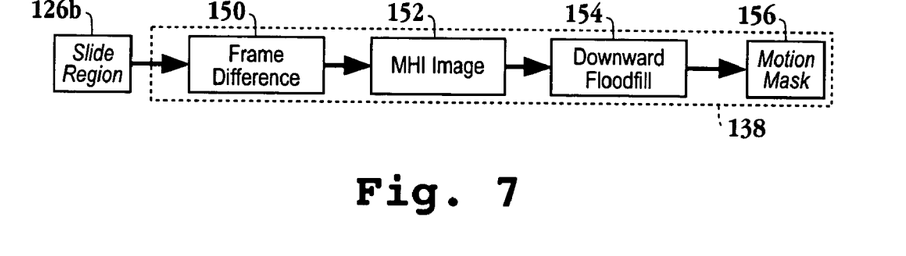
FIG. 7 is a more detailed schematic diagram of the motion suppression module of FIG. 6 in accordance with one embodiment of the invention.

FIG. 7 is a more detailed schematic diagram of the motion suppression module of FIG. 6 in accordance with one embodiment of the invention. Slide region 126b is delivered to module 150 where the frame difference of the luminance channels between adjacent frames is determined. Additionally, the binary thresholding of the frame difference is computed and the results are used to generate a silhouette. The output of module 150 is delivered to module 152 where the silhouette is copied into a separate image and assigned the value of a most recent timestamp. A time delta is set such that pixels that fall below the threshold are set to zero. It should be appreciated that this composite motion history image (MHI) now contains regions of motions grouped together by their time stamps. The composite motion history image for module 152 is then delivered to module 154 where a downward stepping flood fill is used to group and segment the most recent motion regions into motion mask 156. It will be apparent to one skilled in the art that edges located within the motion mask are now excluded from the edge histogram with reference to FIG. 6 through the motion suppression module.

Figure 8:
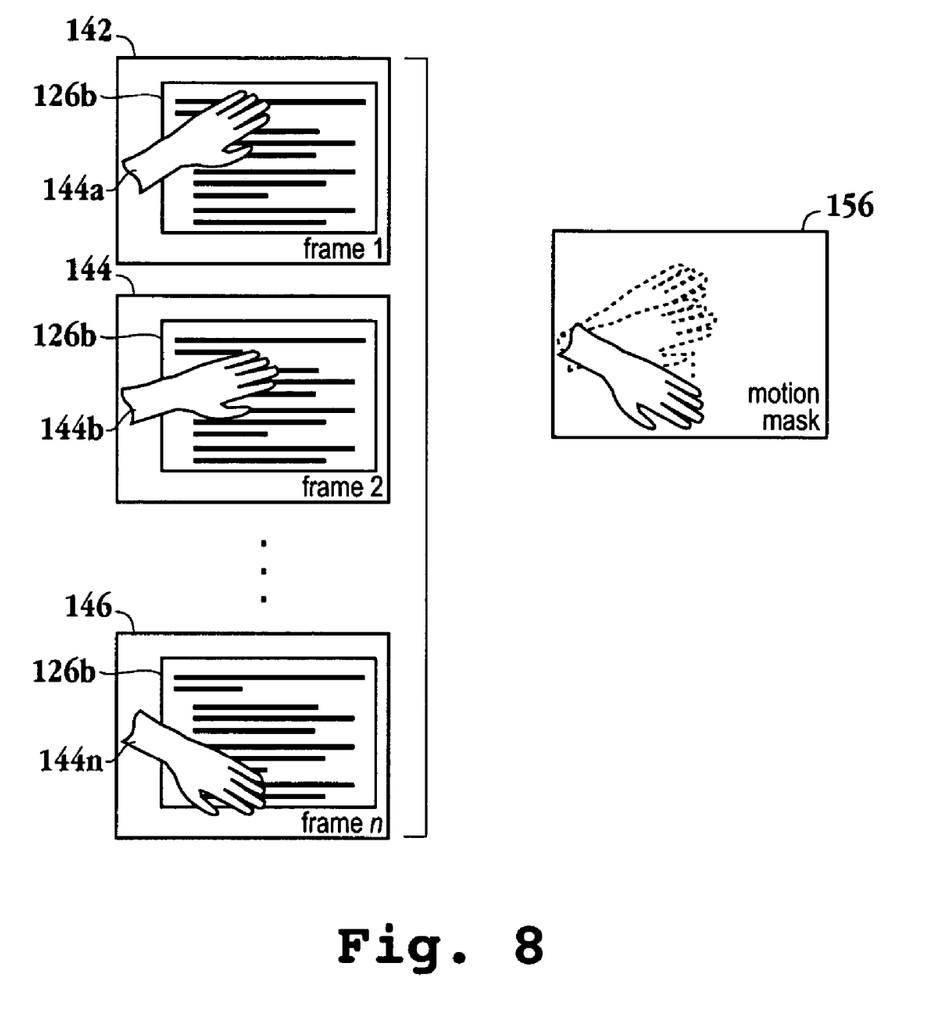
FIG. 8 represents a pictorial illustration of the motion mask in accordance with one embodiment of the invention.

FIG. 8 represents a pictorial illustration of the motion mask in accordance with one embodiment of the invention. Here, successive frames of video 142, 144, and 146 include slide region 126b where a presenter's hand is moving over slide region 126b. As can be seen, hand image 144a through 144n moves in a downward direction through successive frames of the video data, thereby occluding portions of slide region 126b. The motion suppression modules, with reference to FIG. 7, are used to generate motion mask 156 of FIG. 8. Thus, the hand movement through the successive frames is captured enabling the embodiments described herein to disregard the artifacts introduced through the motion of the hand image. In one embodiment, the motion suppression module 138 assists in suppressing false slide transitions as will be explained further below.

Figure 9:
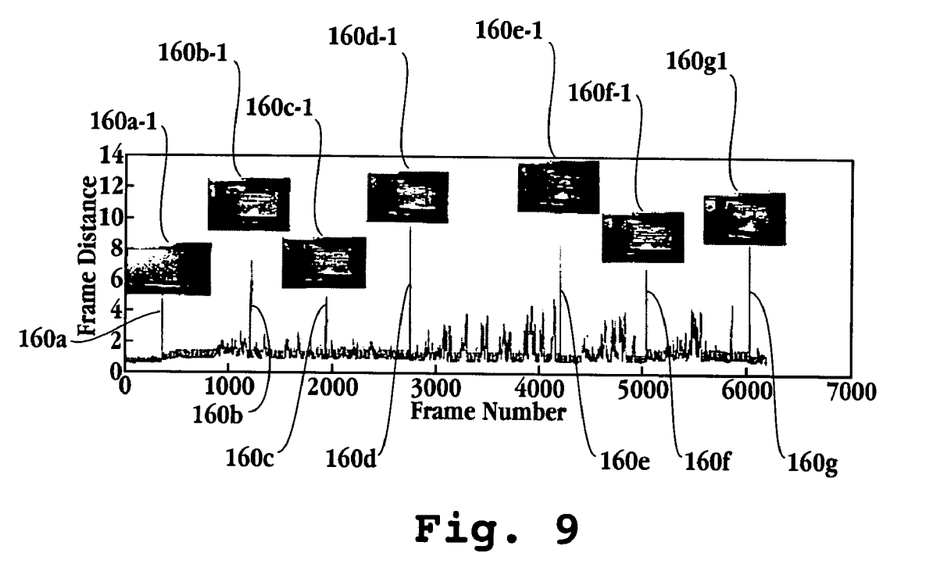
FIG. 9 is a video trace representing slide transitions during various frames of the video presentation in accordance with one embodiment of the invention.

FIG. 9 is a video trace representing slide transitions during various frames of the video presentation in accordance with one embodiment of the invention. Here, peaks 160a through 160g, and corresponding video frames 160a-1 through 160g-1, illustrate transition points where a slide is being changed. Thus, the slide regions associated with video frames 160a-1 through 160g-1 represent key frames which may be used as a template to link an original slide to the corresponding video shot. The edge histograms from adjacent frames are compared using a correlation measure as described in Equation (2):

$$Corr = \frac{\sum_i q_i v_i}{\sqrt{\sum_i q_i^2 \sum_i v_i^2}}$$

The correlation values derived from equation 2 are used to generate a video trace, and peaks in the trace correspond to shot transitions. It should be appreciated that motion suppression helps to reduce the false peaks between frames 3000-4000 in FIG. 9 by eliminating the moving regions from the correlation comparison.

Figure 10:
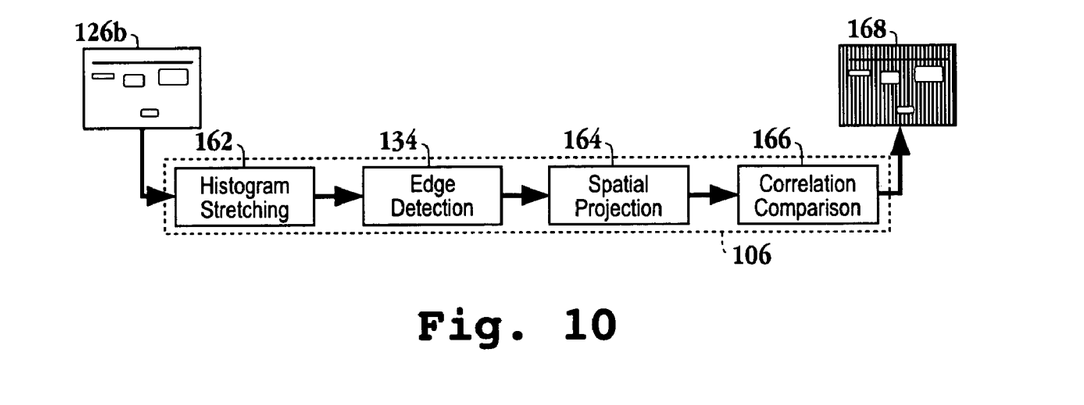
FIG. 10 is a schematic diagram representing a template matching module in accordance with one embodiment of the invention.

FIG. 10 is a schematic diagram representing a template matching module in accordance with one embodiment of the invention. Here, slide region 126b is processed through histogram stretching module 162, which functions similarly to contrast stretching module 132 with reference to FIG. 6. The output of module 162 is delivered to module 134 where edge detection is performed as described above. The output of edge detection module 134 is then delivered to spatial projection module 164. Here, a one-dimensional histogram is generated by projecting edge magnitudes onto the x and y axis. In order to compare the histogram against those of the original presentation media, e.g., slides, similar processing is performed on images generated from the slides. That is, the edge detection, spatial comparison and correlation comparison are performed with the original presentation media. Then, the original slide is matched with the slide region, i.e., key frame, that most closely correlates through the correlation comparison. It should be appreciated that the original presentation media does not need to have histogram stretching applied as the original presentation media or a copy thereof is of a sufficient quality level.

Figure 11:
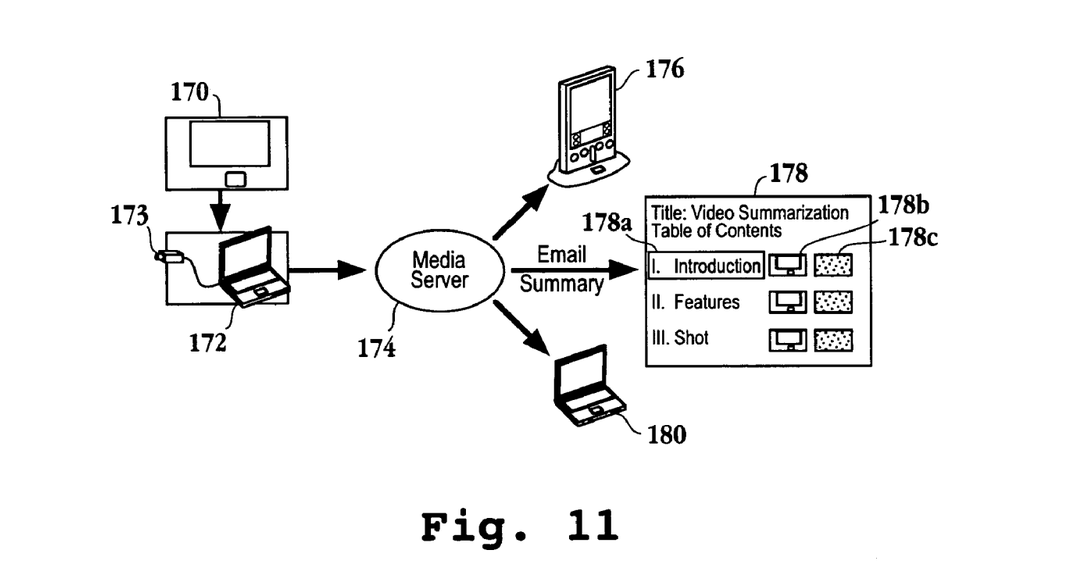
FIG. 11 is a high level schematic diagram of a system capable of capturing and summarizing video from a presentation and emailing the summary to a user.

FIG. 11 is a high level schematic diagram of a system capable of capturing and summarizing video from a presentation and emailing the summary to a client or a user. Image capture device 173 captures a video image of presentation 170. The captured video data is transmitted to laptop computer 172. Laptop computer 172 may be configured to execute the slide segmentation, shot detection, and template matching modules described above. Of course, laptop computer 172 may be any suitable computing device that is configured to execute the functionality described herein. Laptop computer 172 is in communication with media server 174. In one embodiment, laptop computer segments the video into shots that correspond to the original slides of the presentation. The video shots are then encoded, e.g., into a Motion Picture Expert Group (MPEG) or some other suitable audio video compression standard, and stored on media server 174. In another embodiment, a web page summary structured as table of contents 178 is created and stored on media server 174.

Still referring to FIG. 11, table of contents 178 includes a number of indices where each index includes title of the slide 178a, thumbnail of the slide 178c and key frame 178b that links to the corresponding video stream. Thus, the stored web page may be emailed from media server 174 to a user having a computing device (client) configured to receive the emailed data. For example, personal digital assistant (PDA) 176, laptop 180, or any other suitable device capable of receiving email may be the recipient of the web page. Once the client receives the web page, the user can quickly browse the TOC to get an overview of the presentation. The user may also access a full screen version of thumbnail 178c through the thumbnail or download the corresponding video shot through key frame 178b. It will be apparent to one skilled in the art that a receiving device with limited resources, i.e., a handheld electronic device, can now view the key frame or video shot, as opposed to receiving the entire video stream, which is likely beyond the capabilities of the handheld device. In one embodiment, the automated summarization technique described herein may be performed at media server 174 rather than laptop 172.

It should be appreciated that the above described embodiments may be implemented in software or hardware. One skilled in the art will appreciate that the modules may be embodied as a semiconductor chip that includes logic gates configured to provide the functionality discussed above. For example, a hardware description language (HDL), e.g., VERILOG, can be employed to synthesize the firmware and the layout of the logic gates for providing the necessary functionality described herein to provide a hardware implementation of the automatic summarization techniques and associated functionality.

Figure 12:
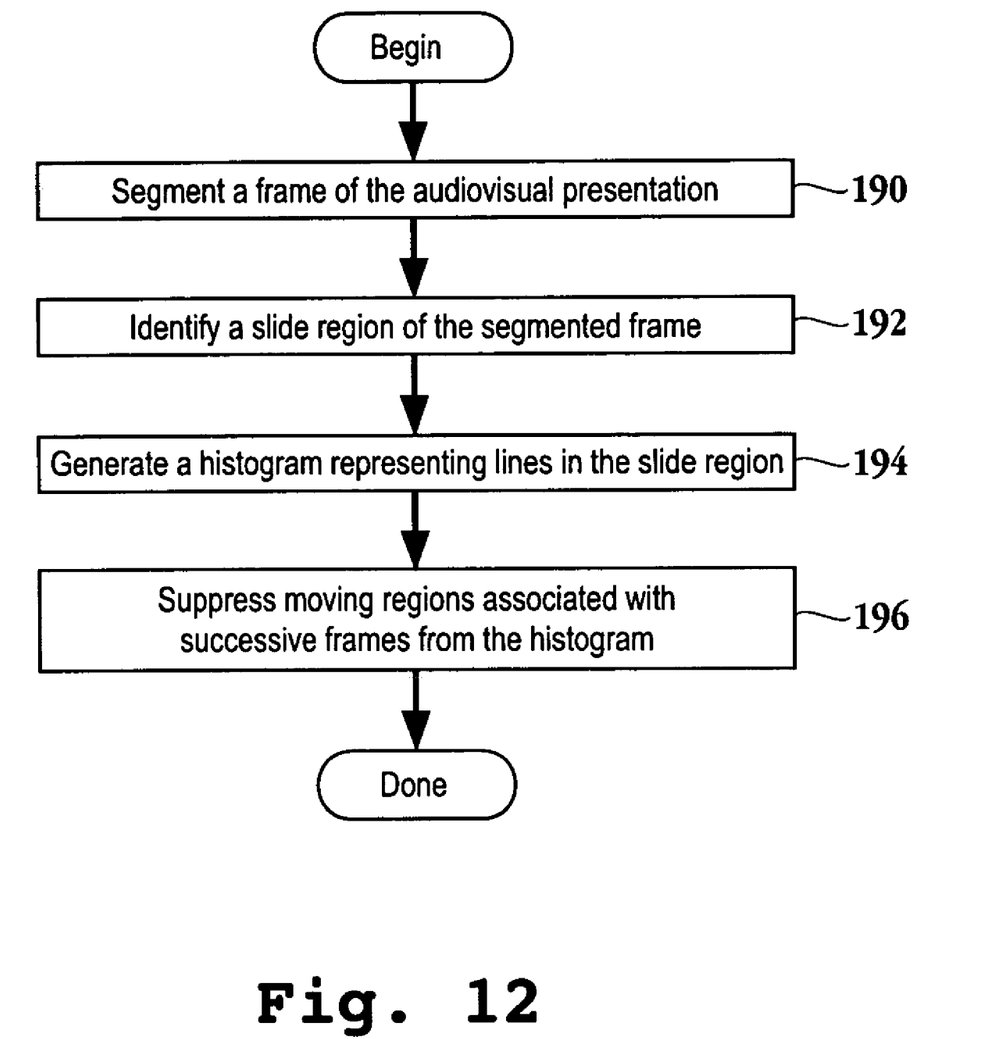
FIG. 12 is a flow chart representing the method operations for creating a summary of an audio visual presentation in accordance with one embodiment of the invention.

FIG. 12 is a flow chart representing the method operations for creating a summary of an audio visual presentation in accordance with one embodiment of the invention. The method initiates with operation 190 where a frame of the audio visual presentation is segmented. Here, the color segmentation technique described above with reference to FIGS. 3-5C may be used to segment the frame of the audiovisual presentation into dominant and coherent regions. The method then advances to operation 192 where a slide region of the segmented frame is identified. Here, certain characteristics, i.e., such as shape ratio, are be used to identify the slide region. Additionally, a threshold value may be used in order to eliminate small regions of the video frame.

The method of FIG. 12 then proceeds to operation 194 where a histogram representing lines in the slide region is generated. Here, the shot detection module may be used to generate the histogram. The method then moves to operation 196 where moving regions associated with successive frame are suppressed from the histogram. In one embodiment, motion suppression is applied as described above to reduce the effects of moving objects intersecting the slide region and creating false alarms during shot detection. Additionally, template matching may be performed on the histogram in order to match the slide region with a stored original or copy of the slide through correlation comparison. Thus, the video frame containing the slide region and correlated original or copy of the slide are used to create a summarization, such as the summarization with reference to FIG. 11.

In summary, the above described invention provides a real time summarization of an audiovisual presentation. The summarization enables users to browse a lengthy seminar or presentation and view specific content quickly and efficiently. Additionally, the recorded content may be stored on a server, thereby enabling a user access through the Internet. The summarization enables clients with limited resources the ability to view certain shots of the presentation, where the client would be unable to otherwise process the full video stream. Thus, a video recording device may be used to capture the presentation and transmit the captured data to a computer having access to the slides used for the presentation. Through the slide segmentation module, shot detection module, and the template matching module, a summarization of the presentation is provided. In one embodiment, the summarization is in the form of a table of contents.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for creating a summary of an audiovisual presentation, comprising method operations of:
   segmenting a frame of the audiovisual presentation;
   identifying a slide region of the segmented frame;
   generating a histogram representing lines in the slide region; and
   suppressing moving regions associated with successive frames from the histogram, the suppressing including,
      assigning a foreground silhouette a most recent timestamp; and
      generating a motion mask, wherein edges located within the motion mask are excluded from the histogram.

2. The method of claim 1, further comprising:
   generating a histogram from a stored slide associated with the slide region; and
   matching the histogram representing lines in the slide region with the histogram from the stored slide.

3. The method of claim 1, wherein the method operation of identifying a slide region of the segmented frame includes,
   determining a shape ratio of the slide region.

4. The method of claim 1, wherein the method operation of generating a histogram representing lines in the slide region includes,
   detecting edges of text and figures of the slide region; and
   transforming data representing the edges into a parameter space.

5. The method of claim 1, wherein the method operation of suppressing moving regions associated with successive frames from the histogram includes,
   generating the silhouette through differences of luminance channels between frames.

6. The method of claim 1, wherein the method operation of segmenting a frame of the audiovisual presentation includes,
   comparing each pixel value of the frame with neighbor pixel values in causal order.

7. The method of claim 6, wherein the neighbor pixel values include five neighbor pixel values.

8. The method of claim 7, wherein the five neighbor pixel values include two previous adjacent pixel values from the frame, a corresponding pixel value from a previous frame, and two adjacent pixel values from the previous frame.

9. A computer readable medium having program instructions for creating a summary of an audiovisual presentation, comprising:
   program instructions for segmenting a frame of the audiovisual presentation;
   program instructions for identifying a slide region of the segmented frame;
   program instructions for generating a histogram representing lines in the slide region; and
   program instructions for suppressing moving regions associated with successive frames from the histogram the program instructions for suppressing including,
   assigning a foreground silhouette a most recent timestamp; and
   generating a motion mask, wherein edges located within the motion mask are excluded from the histogram.

10. The computer readable medium of claim 9, further comprising:
    program instructions for generating a histogram from a stored slide associated with the slide region; and
    program instructions for matching the histogram representing lines in the slide region with the histogram from the stored slide.

11. The computer readable medium of claim 9, wherein the program instructions for identifying a slide region of the segmented frame includes,
    program instructions for determining a shape ratio of the slide region.

12. The computer readable medium of claim 9, wherein the program instructions for generating a histogram representing lines in the slide region includes,
    program instructions for detecting edges of text and figures of the slide region; and
    program instructions for transforming data representing the edges into a parameter space.

13. The computer readable medium of claim 9, wherein the program instructions for suppressing moving regions associated with successive frames from the histogram includes,
    program instructions for generating the silhouette through differences of luminance channels between frames.

14. A method for creating a summary of an audiovisual presentation, comprising method operations of:
    segmenting a frame of the audiovisual presentation, the segmenting including;
       comparing each pixel value of the frame with a plurality of neighbor pixel values, the plurality of neighbor pixel values including pixel values from the frame and from a previous frame;
identifying a slide region of the segmented frame;
generating a histogram representing lines in the slide region; and
suppressing moving regions associated with successive frames from the histogram;
the suppressing including, capturing a foreground silhouette; copying the foreground silhouette; assigning the copied foreground silhouette a most recent timestamp; and generating a motion mask, wherein the edges located within the motion mask are excluded from the histogram.

15. The method of claim 14, wherein the plurality of neighbor pixel values include five pixel values.

* * * * *